(12) United States Patent
Tsukamoto

(10) Patent No.: US 6,554,178 B1
(45) Date of Patent: Apr. 29, 2003

(54) BATTERY CASE FEEDTHROUGH

(75) Inventor: Hisashi Tsukamoto, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 0 days.

(21) Appl. No.: 09/421,171

(22) Filed: Oct. 19, 1999

Related U.S. Application Data

(62) Division of application No. 09/290,012, filed on Apr. 8, 1999.

(51) Int. Cl.[7] ............................................. H01M 10/04
(52) U.S. Cl. ............................ 228/122.1; 228/124.6; 29/623.1
(58) Field of Search .......................... 228/122.1, 123.1, 228/124.1, 124.5, 124.6; 429/181, 176, 175, 177; 29/623.4, 623.1

(56) References Cited

U.S. PATENT DOCUMENTS

| | | | |
|---|---|---|---|
| 3,443,306 A | | 5/1969 | Meyer |
| 3,600,017 A | | 8/1971 | Scherer |
| 3,646,405 A | | 2/1972 | Wallis et al. |
| 3,733,686 A | | 5/1973 | Maucher |
| 4,213,558 A | | 7/1980 | Hirobe et al. |
| 4,352,714 A | | 10/1982 | Patterson et al. |
| 4,372,038 A | | 2/1983 | Goebel |
| 4,479,168 A | | 10/1984 | Green, Jr. |
| 4,532,489 A | | 7/1985 | Phillips |
| 4,538,212 A | | 8/1985 | Montgomery |
| 4,690,480 A | | 9/1987 | Snow et al. |
| 4,831,708 A | | 5/1989 | Yoshiwara et al. |
| 4,966,748 A | | 10/1990 | Miyasaka et al. |
| 5,001,299 A | | 3/1991 | Hingorany |
| 5,041,019 A | | 8/1991 | Sharp et al. |
| 5,109,594 A | | 5/1992 | Sharp et al. |
| 5,110,307 A | | 5/1992 | Rapoza |
| 5,250,845 A | | 10/1993 | Runyan |
| 5,298,683 A | | 3/1994 | Taylor |
| 5,397,661 A | | 3/1995 | Kaun |
| 5,405,272 A | | 4/1995 | Rapoza |
| 5,433,260 A | | 7/1995 | Taylor |
| 5,500,026 A | * | 3/1996 | Heller et al. ................ 29/623.1 |
| 5,535,097 A | | 7/1996 | Ruben et al. |
| 5,675,122 A | | 10/1997 | Taylor |
| 5,701,758 A | | 12/1997 | Haramoto et al. |
| 5,811,206 A | * | 9/1998 | Sunderland et al. ........ 429/181 |
| 6,071,557 A | | 6/2000 | Haraguchi et al. |
| 6,090,503 A | * | 7/2000 | Taylor et al. ................ 429/181 |
| 6,127,064 A | * | 10/2000 | Shibata et al. ............... 429/163 |
| 6,132,900 A | * | 10/2000 | Yoshizawa et al. ......... 429/185 |

FOREIGN PATENT DOCUMENTS

| | | |
|---|---|---|
| EP | 0 522 687 B1 | 3/1997 |
| JP | 02022831 A2 | 1/1990 |
| JP | 04055066 A2 | 2/1992 |
| JP | 04081288 A2 | 3/1992 |
| JP | 07-124755 A2 | 5/1995 |
| JP | 08-332540 A2 | 12/1996 |
| JP | 09076076 A2 | 3/1997 |
| JP | 09-155561 A2 | 6/1997 |
| JP | 09-174243 A2 | 7/1997 |
| JP | 10-208777 A2 | 8/1998 |

* cited by examiner

Primary Examiner—M. Alexandra Elve
Assistant Examiner—Len Tran
(74) Attorney, Agent, or Firm—M. Elizabeth Bush

(57) ABSTRACT

This invention is an improved method for making a battery case feedthrough. It utilizes stainless steel or titanium metal clad with aluminum. The use of the clad metal enables the fabrication of the battery case and cover and feedthrough pin assembly where a high temperature ceramic-metal hermetic seal is needed between a stainless steel feedthrough pin and a ceramic insulator; and between a ceramic insulator and a surrounding hollow cylinder. A high temperature hermetic seal is also used to fasten the feedthrough pin assembly to the upper stainless steel part of the stainless steel-aluminum clad cover. Titanium can be substituted for stainless steel. Lower temperature metal-metal hermetic seals are needed between the aluminum-clad part of the cover and the aluminum battery casing.

20 Claims, 2 Drawing Sheets

BATTERY CASE FEEDTHROUGH

This is a divisional of application Ser. No. 09/290,012 filed Apr. 8, 1999.

FIELD OF THE INVENTION

This invention relates to battery case feedthroughs. It also relates to clad metals. Also it relates to high temperature ceramic-metal hermetic seals and to lower temperature metal-metal hermetic seals.

BACKGROUND OF THE INVENTION

There are different methods for forming clad metal, such as a plate of stainless steel clad with aluminum. In one method (U.S. Pat. No. 4,213,558, Hirobe, et al.), sheet metal cladding is fed onto one or both faces of the hot solidified continuously cast strip being withdrawn from the casting means and the assembly is then passed to a hot roll bonding system for cladding. Another method (U.S. Pat. No. 4,966,748, Miyasaka et al.) produces a clad metal by forming a layer of dissimilar metal powder on the surface of a base metal by cold fixing the powder to the surface under pressure, densing only the surface and a subsurface area of the layer of the dissimilar metal powder by melting and immediately solidifying in a vacuum, compressing the layer of the dissimilar metal powder together with the base metal at a temperature not higher than the solidus-line temperature of the two dissimilar metals under a pressure of not lower than 300 kgf/cm$^2$ using a hot isostatic press, and hot working the layer of the dissimilar metal powder together with the base metal.

Ceramic to stainless steel and ceramic to titanium bonds are particular examples of ceramic to metal bonds. Braze bonding, for example, aluminum oxide and zirconium oxide ceramics to metals, including titanium, stainless steel, molybdenum, tantalum, and cobalt-chromium alloys, can be done using a braze, comprising 30% nickel and 70% titanium (U.S. Provisional Patent Application, Serial No. 60/126,531; PCT Application WO00/56677). Another example of a braze bond includes the preferred method for joining zirconium oxide containing 3% yttrium to preferably a metal alloy, namely, titanium and niobium (55% Ti and 45% Nb), using the nickel-titanium braze (50% Ni and 50% Ti) (U.S. Provisional Patent Application, Serial No. 60/126,514; PCT Application WO00/56395).

How can a high temperature brazing operation for joining metal and ceramic be made compatible with the further low temperature joining of two metal surfaces, these two metal surfaces having a relatively low melting temperature?

SUMMARY OF THE INVENTION

This invention makes use of clad metals in order to provide high temperature and low temperature seals. For example, stainless steel and aluminum can form a hermetically bonded clad combination. The stainless steel or titanium can be used with a high temperature braze in order to form a hermetic seal bond with a ceramic material such as aluminum oxide or zirconium oxide.

The method of use of this for battery feedthroughs is the placement of a stainless steel or titanium pin through a cylinder of ceramic, such as aluminum oxide or zirconium oxide. This ceramic is surrounded by on annular cylinder of stainless steel or titanium. A hole is formed in an aluminum clad stainless-steel sheet, with the stainless steel forming the upper layer. A high temperature welding process, for example, hermetically bonds the upper stainless-steel layer to the outer stainless steel cylinder of the feedthrough assembly. The lower aluminum layer is easily laser welded to the battery case cover of aluminum. If the clad metal was not used, the high temperature used to embed the central stainless-steel feedthrough pin in the ceramic cylinder, would destroy the aluminum battery casing and cover.

BRIEF DESCRIPTION OF THE DRAWINGS

The above and other features and advantages of the invention will be more apparent from the following detailed description wherein.

DETAILED DESCRIPTION OF THE PREFERRED EMBODIMENT

Figure 1:
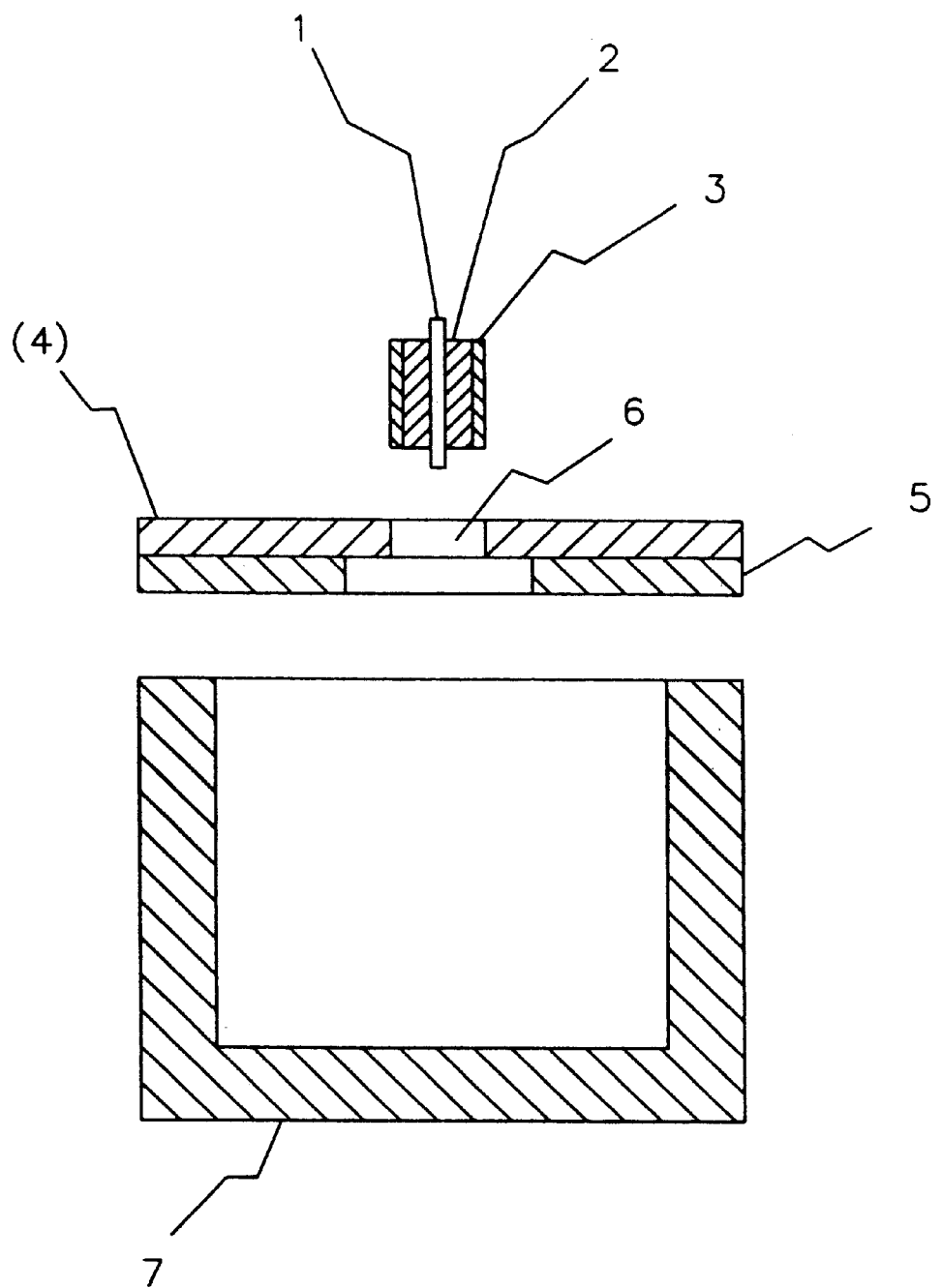
FIG. 1 shows an exploded view of the feedthrough for the battery casing with aluminum clad stainless steel (or titanium) material.

The following description is of the best mode presently contemplated for carrying out the invention. This description is not to be taken in a limiting sense, but is merely made for the purpose of describing the general principles of the invention. The scope of the invention should be determined with reference to the claims.

This invention makes use of clad metals in order to provide high temperature and low temperature seals. For example, stainless steel, and titanium, can form an hermetically bonded clad combination with aluminum. The stainless steel or titanium can be used with a high temperature braze in order to form a hermetic seal bond with a ceramic material such as aluminum oxide or zirconium oxide. The method of use of this for battery feedthroughs is that of the baking in, or brazing in, of a stainless steel or titanium pin (1) in a cylinder of ceramic (2), such as aluminum oxide or zirconium oxide. This ceramic is surrounded by on annular cylinder (3) of stainless steel or titanium. The cylindrical combination of metal feedthrough pin, ceramic insulator, and metal surrounding cylinder allows for welding the stainless steel, or titanium, outer cylinder, hermetically, to the upper part of a stainless steel, or titanium, sheet (4), aluminum clad (5), with a hole (6) prepared in it. The upper part of said clad sheet is stainless steel (or titanium) (4), the lower part is aluminum (5), and the lower sheet can be hermetically welded to an aluminum case (7), for example, an aluminum battery case.

Figure 2:
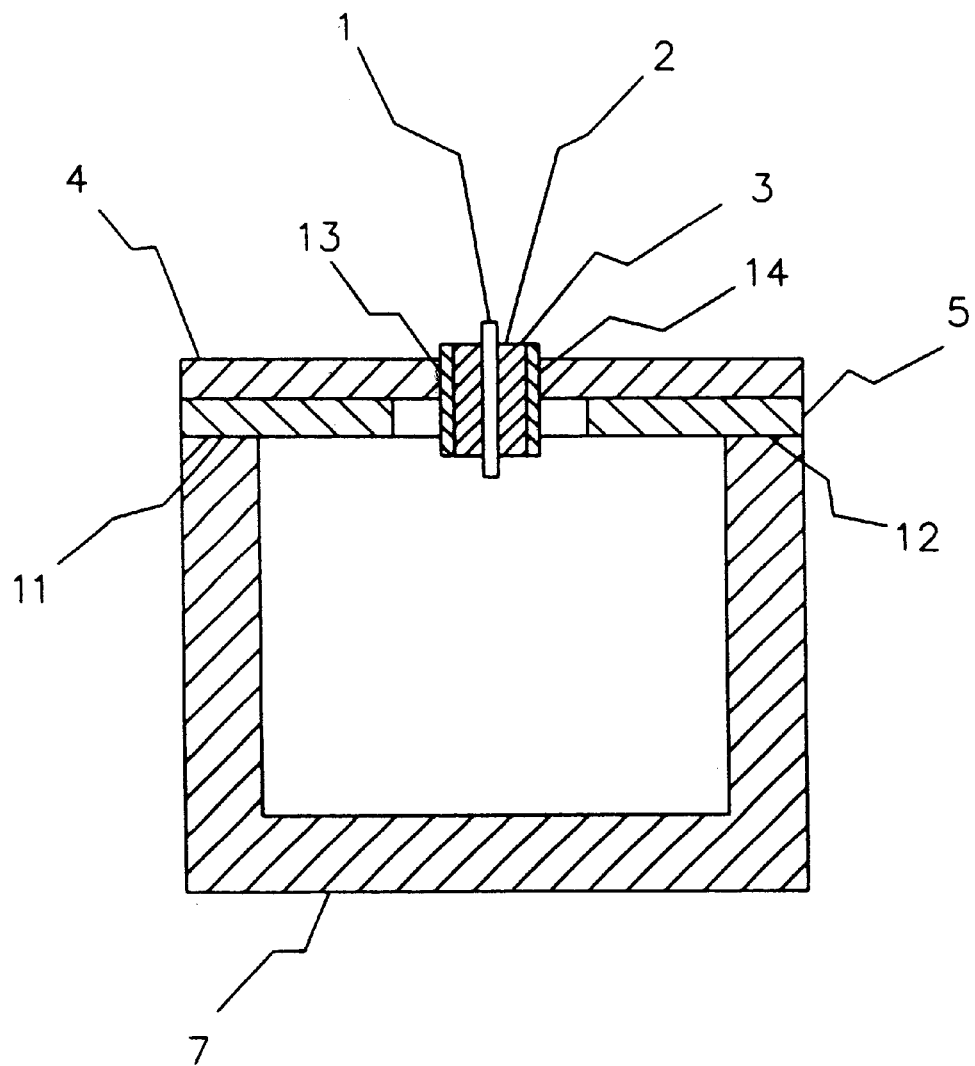
FIG. 2 shows a non-exploded view of FIG. 2.

If the clad metal were not used, the high temperature used to hermetically bond the feedthrough pin assembly (stainless-steel feedthrough pin, ceramic cylinder, outer stainless-steel cylinder) would require a stainless steel cover with which to bond the assembly. However, in trying to bond the stainless-steel cover to the aluminum case, the welding, or brazing, temperature would melt the aluminum. The melting point temperatures of the metals are aluminum 660.37° C., stainless steel-303, 1427° C., and titanium 1660+/−10° C. In FIG. 2, Low temperature hermetic welds are shown at (11) and (12). High temperature welds are shown at (13) and (14).

While the invention herein disclosed has been described by means of specific embodiments and applications thereof, numerous modifications and variations could be made thereto by those skilled in the art without departing from the scope of the invention set forth in the claims.

What is claimed is:

1. A method for sealing a battery case comprising the steps of:

providing a battery case comprising a first low melting point metal, said battery case having an upper surface having an outer edge;

providing a cover having an outer, lower edge and comprising a sheet of a first high melting point metal hermetically clad with a second low melting point metal, the clad sheet having hole therethrough;

furnishing a feedthrough comprising:
- a ceramic cylinder;
- a conductive pin through said ceramic cylinder and hermetically sealed thereto; and
- an annular cylinder comprising a second high melting point metal, surrounding said ceramic cylinder and hermetically sealed thereto;

hermetically joining the feedthrough to the cover by using heat to join the second high melting point metal to the first high melting point metal; and hermetically attaching the first low melting point metal of the battery case to the second low melting point metal of the cover using heat such that the outer, lower edge of the cover is substantially flush with the outer edge of the upper surface of the battery case.

2. A method as in claim 1 wherein said step of providing a cover comprises:
bonding the second low melting point metal to the first high melting point metal using pressure and heat; and
preparing a hole through the clad sheet.

3. A method as in claim 2 wherein said step of preparing a hole through the clad sheet comprises preparing a stepped hole through the clad sheet.

4. A method as in claim 2 wherein said bonding step comprises:
feeding sheet metal cladding onto at least one face of a strip to form an assembly; and;
passing the assembly to a hot roll bonding system for cladding.

5. The method as in claim 4 wherein said feeding step comprises feeding sheet metal cladding onto both faces of said strip.

6. A method as in claim 1 wherein said furnishing step comprises:
supplying the ceramic cylinder;
placing the pin through the ceramic cylinder;
hermetically sealing the pin to the ceramic cylinder;
surrounding the ceramic cylinder with the annular cylinder comprising the second high melting point metal; and
hermetically sealing the ceramic cylinder to the annular cylinder.

7. A method as in claim 6 wherein said step of hermetically sealing the pin to the ceramic cylinder comprises baking in a stainless steel or titanium pin in the ceramic cylinder.

8. A method as in claim 1 wherein said joining step comprises welding.

9. A method as in claim 1 wherein said attaching step comprises welding.

10. A method as in claim 1 wherein said joining step comprises high temperature welding and wherein said attaching step comprises low temperature welding.

11. A method as in claim 1 wherein:
the first and second low melting point metals comprise aluminum; and
the first and second high melting point metals comprise titanium.

12. A method as in claim 1 wherein:
the first and second low melting point metals comprise aluminum; and
the first and second high melting point metals comprise stainless steel.

13. A method for sealing a battery case comprising the steps of:
providing a battery case comprising a first low melting point metal;
providing a cover comprising a sheet of a first high melting point metal hermetically clad with a second low melting point metal by:
bonding the second low melting point metal to the first high melting point metal using pressure and heat; and
preparing a stepped hole through the clad sheet;
furnishing a feedthrough comprising the steps of:
supplying a ceramic cylinder;
placing a titanium or stainless steel pin through the ceramic cylinder;
hermetically sealing the pin to the ceramic cylinder;
surrounding the ceramic cylinder with an annular cylinder comprising a second high melting point metal; and
hermetically sealing the ceramic cylinder to the annular cylinder;
hermetically welding the second high melting point metal of the feedthrough to the first high melting point metal of the cover; and
hermetically welding the first low melting point metal of the battery case to the second low melting point metal of the cover.

14. A method as in claim 13 wherein said bonding step comprises:
feeding sheet metal cladding onto at least one face of a strip to form an assembly; and;
passing the assembly to a hot roll bonding system for cladding.

15. The method as in claim 14 wherein said feeding step comprises feeding sheet metal cladding onto both faces of said strip.

16. A method as in claim 13 wherein:
the first and second low melting point metals comprise aluminum; and
the first and second high melting point metals comprise titanium.

17. A method as in claim 13 wherein:
the first and second low melting point metals comprise aluminum; and
the first and second high melting point metals comprise stainless steel.

18. A method for sealing a battery case comprising the steps of:
providing a battery case comprising a first low melting point metal;
providing a cover comprising a sheet of a first high melting point metal hermetically clad with a second low melting point metal, the clad sheet having a hole therethrough;
furnishing a feedthrough comprising:
a ceramic cylinder;
a conductive pin placed through said ceramic cylinder and hermetically sealed thereto; and
an annular cylinder comprising a second high melting point metal, surrounding said ceramic cylinder and hermetically sealed thereto;

hermetically joining the feedthrough to the cover by using a high temperature weld to join the second high melting point metal to the first high melting point metal; and hermetically attaching the first low melting point metal of the battery case to the second low melting point metal of the cover using a low temperature weld.

19. A method as in claim 18 wherein:

the first and second low melting point metals comprise aluminum; and the first and second high melting point metals comprise titanium.

20. A method as in claim 18 wherein:

the first and second low melting point metals comprise aluminum; and the first and second high melting point metals comprise stainless steel.

* * * * *